US011750814B2

(12) United States Patent
Minoo et al.

(10) Patent No.: US 11,750,814 B2
(45) Date of Patent: *Sep. 5, 2023

(54) SINGLE LAYER HIGH DYNAMIC RANGE CODING WITH STANDARD DYNAMIC RANGE BACKWARD COMPATIBILITY

(71) Applicant: ARRIS Enterprises LLC, Suwanee, GA (US)

(72) Inventors: Koohyar Minoo, San Diego, CA (US); Zhouye Gu, San Jose, CA (US); David M. Baylon, San Diego, CA (US); Ajay Luthra, San Diego, CA (US); Yue Yu, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,079

(22) Filed: Jan. 4, 2023

(65) Prior Publication Data

US 2023/0141102 A1 May 11, 2023

Related U.S. Application Data

(63) Continuation of application No. 17/667,059, filed on Feb. 8, 2022, now Pat. No. 11,575,899, which is a
(Continued)

(51) Int. Cl.
*H04N 19/124* (2014.01)
*H04N 19/186* (2014.01)
(Continued)

(52) U.S. Cl.
CPC .......... *H04N 19/124* (2014.11); *G06T 5/007* (2013.01); *H04N 19/174* (2014.11);
(Continued)

(58) Field of Classification Search
CPC ...... H04N 19/186; H04N 19/44; H04N 19/70; H04N 19/98; H04N 19/124
See application file for complete search history.

(56) References Cited

U.S. PATENT DOCUMENTS

2008/0175496 A1 7/2008 Segall
2014/0314148 A1 10/2014 Lainema et al.
(Continued)

FOREIGN PATENT DOCUMENTS

JP 6075977 A 4/1985

OTHER PUBLICATIONS

Winken et al. ("CE2: SVC Bit-depth Scalable Coding") (Year: 2007).*
(Continued)

*Primary Examiner* — Kathleen V Nguyen
(74) *Attorney, Agent, or Firm* — Chernoff, Vilhauer, McClung & Stenzel, LLP

(57) ABSTRACT

A method for transforming high dynamic range (HDR) video data into standard dynamic range (SDR) video data and encoding the SDR video data so that the HDR video data may be recovered at the decoder includes generating a tone map describing a transformation applied to the HDR video data to generate the SDR video data. The generated tone map describes the transformation as the multiplication of each HDR pixel in the HDR video data by a scalar to generate the SDR video data. The tone map is then modeled as a reshaping transfer function and the HDR video data is processed by the reshaping transfer function to generate the SDR video data. The reshaping transfer function is then inverted and described in a self-referential metadata structure. The SDR video data is then encoded including the metadata structure defining the inverse reshaping transfer function.

12 Claims, 4 Drawing Sheets

Related U.S. Application Data continuation of application No. 15/274,486, filed on Sep. 23, 2016, now Pat. No. 11,277,610.

(60) Provisional application No. 62/242,272, filed on Oct. 15, 2015, provisional application No. 62/241,087, filed on Oct. 13, 2015, provisional application No. 62/241,094, filed on Oct. 13, 2015, provisional application No. 62/222,723, filed on Sep. 23, 2015.

(51) Int. Cl.

| | |
|---|---|
| *H04N 19/44* | (2014.01) |
| *G06T 5/00* | (2006.01) |
| *H04N 19/98* | (2014.01) |
| *H04N 19/70* | (2014.01) |
| *H04N 19/174* | (2014.01) |
| *H04N 19/177* | (2014.01) |

(52) U.S. Cl.
CPC ......... *H04N 19/177* (2014.11); *H04N 19/186* (2014.11); *H04N 19/44* (2014.11); *H04N 19/70* (2014.11); *H04N 19/98* (2014.11); *G06T 2207/20208* (2013.01)

(56) References Cited

U.S. PATENT DOCUMENTS

| | | | |
|---|---|---|---|
| 2016/0134872 A1* | 5/2016 | Su | ........................ H04N 19/192 375/240.03 |
| 2017/0279640 A1 | 9/2017 | Yang et al. | |
| 2018/0020224 A1 | 1/2018 | Su et al. | |
| 2018/0160127 A1 | 6/2018 | Ström et al. | |

OTHER PUBLICATIONS

A. Segall, et al. "System for bit-depth scalable coding", 23rd JVT Meeting, 80th MPEG Meeting, Apr. 21-27, 2007, San Jose (Joint Video Team of ISO/IEC JTC1/SC29/WG11 and ITU-T SG. 16), No. JVT-W113, Apr. 25, 2007, p. 3.

Winken M et al: "CE2: SVC bit-depth scalability", 24. JVT Meeting; 81. MPEG Meeting; Jun. 29, 2007-May 7, 2007; Geneva, CH;(Joint Video Team of ISO/IEC JTC1/SC29/WG11 and ITU-T SG. 16 ), No. JVT-X057, Jul. 4, 2007 (Jul. 4, 2007), XP030007164,ISSN: 0000-0082.

Chen Qian et al: "Near constant-time optimal piecewise LDR to HDR inverse tone mapping", Optomechatronic Micro/Nano Devices and Components III: Oct. 8 -10, 2007, Lausanne, Switzerland; [Proceedings of SPIE , ISSN 0277-786X], SPIE, Bellingham, Wash, vol. 9404, Feb. 27, 2015 (Feb. 27, 2015), pp. 940400-940400, XP060046452, DOI: 10.1117/12.2080389 ISBN: 978-1-62841-730-2.

[1]K. Minoo, Z. Gu, D. Baylon, A. Luthra, Y. Yu, "Ce2.1.2b: HDR coding in Y'CbCr color space based on BT.2020 and ST 2084 transfer functions", Doc. M37091, Oct. 2015, Geneva, Switzerland.

K. Minoo, et al., "Description of the reshaper parameters derivation process in ETM references software", 23rd JCT-VC Meeting, Feb. 19-26, 2016, San Diego (Joint Video Team of ISO/IEC JTC1/SC29/WG11 and ITU-T SG.16), No. JCTVC-W0031, Jan. 11, 2016, the whole document.

PCT Search Report & Written Opinion, Re: Application No. PCT/US2016/053516, dated Jan. 5, 2017.

European Examination Report Re: Application No. 16 779 254.8 dated Feb. 20, 2020.

* cited by examiner

SINGLE LAYER HIGH DYNAMIC RANGE CODING WITH STANDARD DYNAMIC RANGE BACKWARD COMPATIBILITY

This Application is a continuation of U.S. Patent Application Ser. No. 17/667,059 filed Feb. 8, 2022, which is a continuation of U.S. Patent Application Ser. No. 15/274,486 filed Sep. 23, 2016, now U.S. Pat. No. 11,277,610, which claims priority under 35 U.S.C. §119(e) from earlier filed U.S. Provisional Applications Ser. No. 62/222,723, filed Sep. 23, 2015, Ser. No. 62,241,087 filed Oct. 13, 2015, 62/241,094 filed Oct. 13, 2015, and Ser. No. 62/242,272 filed Oct. 15, 2015 which are hereby incorporated by reference.

TECHNICAL FIELD

The present disclosure relates to the field of video encoding and decoding High Dynamic Range (HDR) and/or Wide Color Gamut (WCG) video sequences, particularly a method for encoding such sequences so that they may be decoded and displayed as Standard Dynamic Range (SDR) video data that may be processed to recover HDR and/or WCG video data.

BACKGROUND

HDR video and WCG video provide greater ranges of luminance and color values than SDR video. For example, SDR video can have a limited luminance and color range, such that details in shadows or highlights can be lost when images are captured, encoded, and/or displayed. In contrast, HDR and/or WCG video can capture a broader range of luminance and color information, allowing the video to appear more natural and closer to real life to the human eye.

Many common video encoding and decoding schemes, such as MPEG-4 Advanced Video Coding (AVC) and High Efficiency Video Coding (HEVC), however, are not designed to directly handle HDR or WCG video data. As such, HDR and WCG video data is normally converted into other formats before it can be encoded using one of these video compression algorithms.

For example, HDR video formats such as the EXR file format describe colors in the Red, Green, Blue (RGB) color space with 16-bit half-precision floating point values having 10 significant bits, 5 exponent bits and one sign bit. These values cover a broad range of potential intensity and color values. SDR video employs 8 or 10-bit integer values to express the colors of non-HDR and non WCG video. Many existing video compression algorithms are meant for use with SDR video and, thus, expect to receive 8 or 10-bit integer values. It may be difficult to quantize the 16-bit half-precision floating point color values into 10-bit values that the compression algorithms can work with without substantially reducing video dynamic range or introducing significant distortion.

Some encoders use a coding transfer function to convert linear values from the input video into non-linear values prior to uniform quantization. By way of a non-limiting example, a coding transfer function may include a gamma function that compresses luminance and/or color (chrominance) values at one or both ends of the quantization range so that a larger range may be represented by the 8 or 10 bit values provided to the encoder. The coding transfer function may be fixed, such that it does not change dependent on the content of the input video. For example, an encoder's coding transfer function can be defined to statically map every possible input value in an HDR range, such as from 0 to 10,000 nits (candelas per square meter or $cd/m^2$), to specific non-linear values ranging from 0 to 255 for 8-bit values or 0 to 1023 for 10 bit values. When the input video contains input values in only a portion of that range, however, fixed mapping can lead to poor allocation of quantization levels resulting in quantization distortion in the reproduced image. For example, a picture primarily showing a blue sky can have many similar shades of blue, but those blue shades can occupy a small section of the overall range for which the coding transfer function is defined. As such, similar blue shades may be quantized into the same value. This quantization may be perceived by viewers as contouring or banding, where quantized shades of blue extend in bands across the sky displayed on their screen instead of a more natural transitions between the shades.

Additionally, psychophysical studies of the human visual system have shown that a viewer's sensitivity to contrast levels at a particular location can be more dependent on the average brightness of surrounding locations than the actual levels at the location itself. Many coding transfer functions, however, do not take this into account and instead use fixed conversion functions or tables that do not take characteristics of the surrounding pixels, into account.

SUMMARY

An example method and apparatus transforms high dynamic range (HDR) video data into standard dynamic range (SDR) video data and encoding the SDR video data so that the HDR video data may be recovered at the decoder. The method and apparatus generates a tone map describing a transformation applied to the HDR video data to generate the SDR video data. The tone map describes the transformation as the multiplication of each HDR pixel in the HDR video data by a scalar to generate the SDR video data. The tone map is then modeled as a reshaping transfer function and the HDR video data is processed by the reshaping transfer function to generate the SDR video data. The reshaping transfer function is then inverted and described in a self-referential metadata structure. The SDR video data is then encoded including the metadata structure defining the inverse reshaping transfer function.

BRIEF DESCRIPTION OF THE DRAWINGS

The invention is best understood from the following detailed description when read in connection with the accompanying drawings, with like elements having the same reference numerals. According to common practice, the various features of the drawings are not drawn to the scale. Also, the dimensions of the various features are arbitrarily expanded or reduced for clarity. Included in the drawings are the following figures.

DETAILED DESCRIPTION

The example systems and methods described below adapt the coding transfer function, or otherwise convert and/or redistribute HDR and/or WCG video data to effectively compress the HDR and/or WCG video so that it may be quantized, remapped into SDR data that may be encoded by an SDR encoder such as an HEVC (High Efficiency Video Coding), H.264/MPEG-4 AVC (Advanced Video Coding), or MPEG-2 encoder and then reconstituted, at a receiver, to recover the SDR signal that is subject to an inverse remapping operation to recover at least some of the HDR and/or WCG data. The remapping and inverse remapping functions may be based on the actual video content at the level of a group of pictures, a picture, or a sub-picture window of the input video. These video processes may be achieved by generating transfer functions or tone maps of non-linear values that compress the color and/or intensity information actually present in temporal and/or spatial segments of the input video data instead of across a full range of potential values. In addition, metadata information about the transfer function(s) used to compress and encode the input video data is efficiently inserted into a self-referential metadata structure that is transmitted to decoders. The decoders recover the transfer function(s) as look-up tables (LUTs) to perform corresponding inverse operations when decoding the video data.

Figure 1:
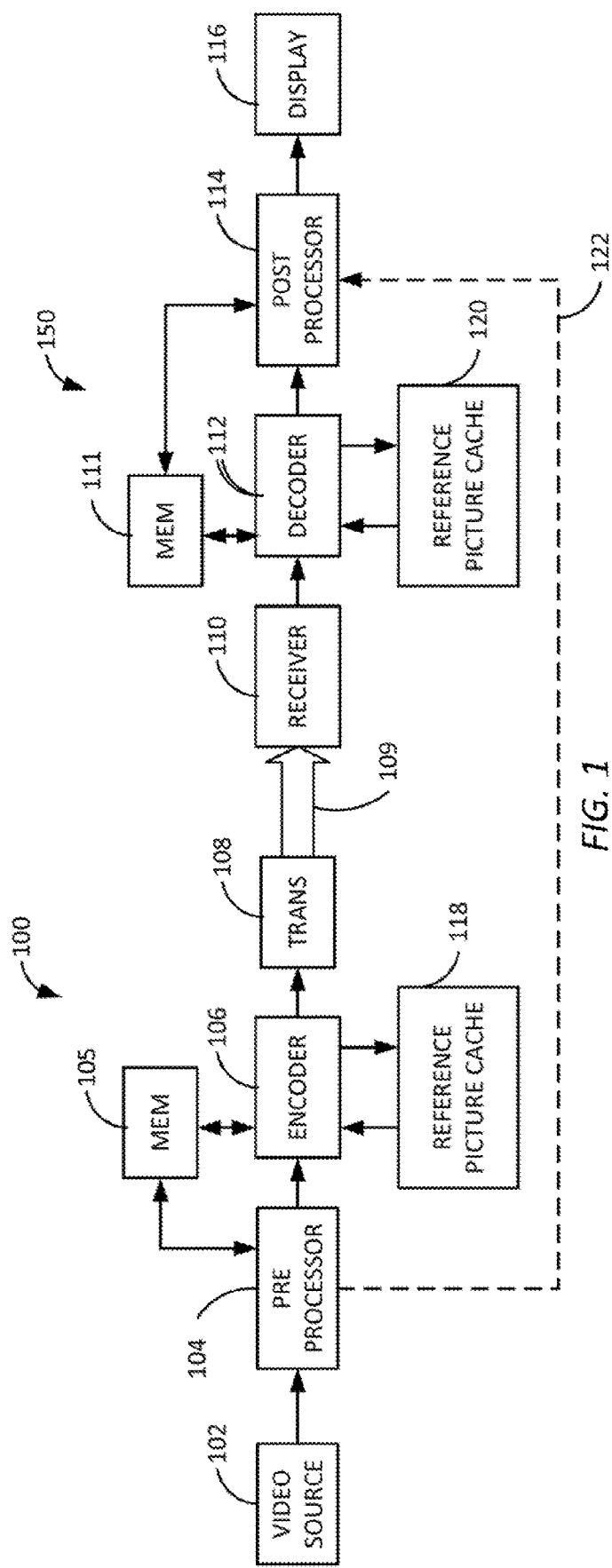
FIG. 1 depicts an embodiment of a video coding system comprising an encoding system and a decoding system.

FIG. 1 depicts an embodiment of a video coding system comprising an encoder system 100 and a decoder system 150. The encoder 100 system can comprise processors, (including digital signal processors (DSPs), or specialized video processors) memory, circuits, and/or other hardware and software elements configured to encode, transcode, and/or compress input video a coded bit stream 109. The encoder system 100 can, for example, be configured to generate the coded bit stream 109 according to a video coding format and/or compression scheme, such as H.265 HEVC (High Efficiency Video Coding), H.264/MPEG-4 Advanced Video Coding (AVC), or MPEG-2.

The example encoder system 100 receives HDR and/or WCG video data from a video source 102. The system 100 includes a preprocessor 104 that adaptively processes the HDR and/or WCG data so that it may be encoded using an encoder 106 and a memory 105. The encoder 106 may be a Main 10 HEVC encoder that encodes video data using reference pictures in a reference picture cache 118. The encoded video data may be stored in the memory 105 which may also store data used by the encoder 106 and/or the preprocessor 104, for example look-up tables that implement transfer functions and/or tone maps. Although the preprocessor 104 and encoder 106 are shown as using a shared memory 105, it is contemplated that separate memories may be used. The encoded data may be transmitted using the transmitter 108 as a bit stream 109 to a receiver 110 of the decoder system 150. The transmitter and receiver may use any transmission method including wired, wireless or optical connections. In one embodiment, the transmitter may format the encoded video data as Internet protocol (IP) packets and transmit the IP packets to the receiver 110 over a network. The network may be a digital cable television connection using Quadrature Amplitude Modulation (QAM), or other digital transmission mechanism. The network may be a wired cable network, an optical fiber network, or a wireless network. The network may be a private network or a global information network (e.g. the Internet®).

In addition to transmitting the encoded video data, the transmitter 100 transmits metadata 122 describing the processing performed by the preprocessor 104. The metadata may be included in the bitstream or signaled separately from the video data. In this example, the metadata 122 is included in the bitstream 109, for example, in the sequence parameter set (SPS) or picture parameter set (PPS) or as supplemental enhancement information (SEI) or video usability information (VUI) data in the bit stream or in the headers of image essences, image sequences, Groups of Picture (GOP), Pictures, Slices, or other sub-picture elements. The SEI or VUI message may identify a rectangular processing windows defined by x and y coordinates of the input image data and particular metadata defining the processing performed by the encoder on the identified processing window. The metadata uses part of the bandwidth of the transmitted bitstream. It is desirable, therefore, to reduce the amount of metadata that is sent from the encoder system 100 to the decoder system 150.

The decoder system 150 can comprise processors, memory, circuits, and/or other hardware and software elements configured to receive the bit stream 109 at receiver 110 and to decode, transcode, and/or decompress the coded bit stream 109 into decoded SDR data and process the decoded SDR data based on the metadata to recover HDR and/or WCG video data for presentation on the display 116. The decoder system 150 can be configured to decode the coded bit stream 109 according to a video coding format and/or compression scheme, such as H.265 HEVC, H.264/MPEG-4 AVC, or MPEG-2. By way of a non-limiting example, in some embodiments the decoder 112 can be a Main 10 HEVC decoder that uses reference images stored in the reference picture cache 120. The decoder 112 is coupled to a memory 111 that holds the coded bit stream and may also hold data used by the decoder and/or the post-processor 114 such as look-up tables implementing inverse transfer functions and/or tone maps. Although the decoder 112 and post-processor 114 are shown as using a shared memory 111, it is contemplated that separate memories may be used. After the SDR video data is decoded, it is processed by the post-processor 114 that, responsive to the metadata received from the encoder, inverts the processing performed by the preprocessor 104 to regenerate the HDR and/or WCG video data. The decoded HDR and/or WCG video data can be output to a display device for playback, such as playback on a television, monitor, or other display 116.

In some embodiments, the encoder system 100 and/or decoder system 150 can be a dedicated hardware devices. In other embodiments the encoder system 100 and/or decoder system 150 can be, or use, software programs running on other hardware such as servers, computers, or video processing devices. By way of a non-limiting example, an encoder system 100 can be a video encoder operated by a video service provider, while the decoder system 150 can be part of a set top box, such as a cable box, connected to a consumer television display.

The input video data provided by the video source 102 can comprise a sequence of image frames, a group of pictures (GOP) or an image essence. In some embodiments, colors in the pictures can be described digitally using one or more values according to a color space or color model. By way of a non-limiting example, colors in a picture can be indicated using an RGB color model in which the colors are described through a combination of values in a red channel, a green channel, and a blue channel.

The input video data can be HDR video having one or more frame sequences with luminance and/or chrominance values described in a high dynamic range (HDR) and/or a wide color gamut (WCG). By way of a non-limiting example, video data having a high dynamic range can have luminance values indicated on a scale with a wider range of possible values than a non-HDR video, and a video using a wide color gamut can have its colors expressed on a color model with a wider range of possible values in at least some channels than a non-WCG video. As such, an HDR input video can have a broader range of luminance and/or chrominance values than standard or non-HDR videos.

In some embodiments, the HDR input video data can have its colors indicated with RGB values in a high bit depth format, relative to non-HDR formats that express color values using lower bit depths such as 8 or 10 bits per color channel. By way of a non-limiting example, the HDR input video data can be in an EXR file format with RGB color values expressed in a linear light RGB domain using a 16 bit floating point value (having 10 significant bits, 5 exponent bits and one sign bit) for each color channel.

Figure 2A:
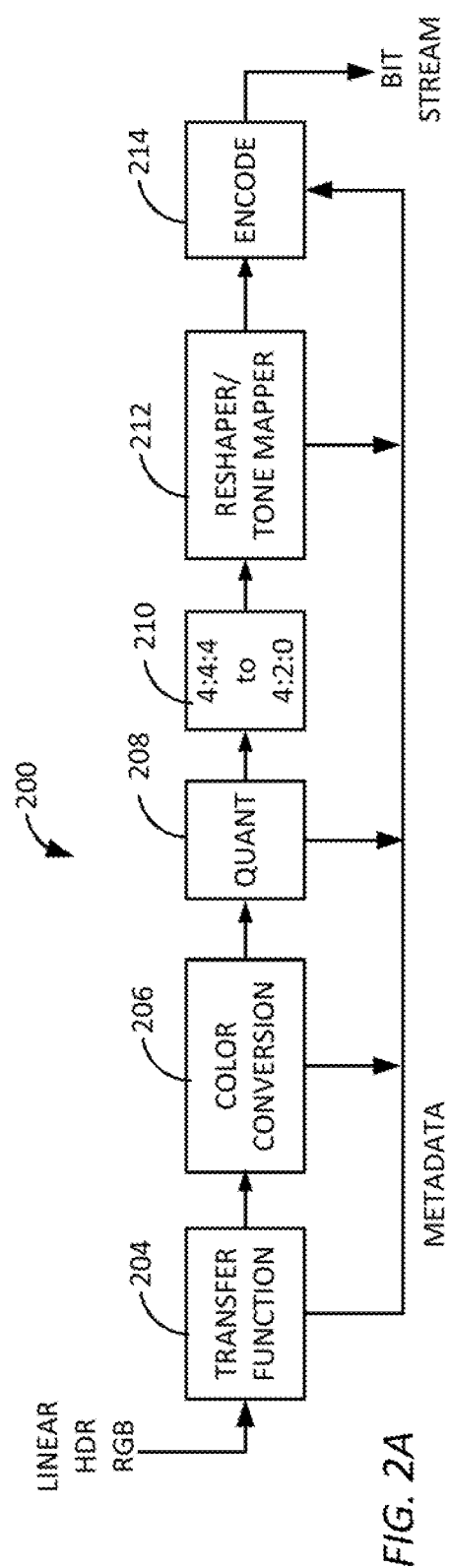
FIGS. 2A and 2B are block diagrams that depict an example of a process for encoding an input HDR and/or WCG video sequence into a coded bit stream compatible with an SDR video encoder, and for decoding that coded bit stream into a decoded video with a complementary video decoder to produce both SDR and HDR video sequences.
Figure 2B:
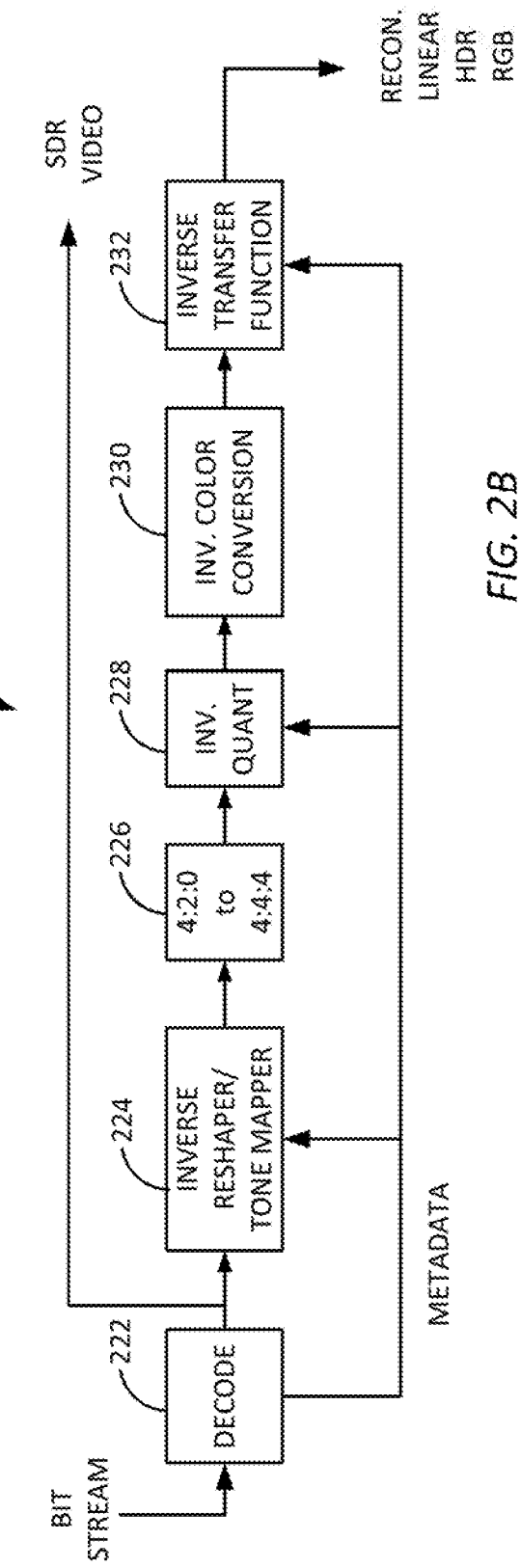

FIGS. 2A and 2B are block diagrams of an example encoder system that may be used to transform HDR video data to SDR video data and an example decoder system that may be used to decode the SDR video data and transform it into HDR video data. As shown in FIG. 2A, the encoder system 200 can apply the linear HDR RGB data to a preprocessor, which includes a first transfer function 204, a color conversion operation 206, a quantizer 208, a chrominance down-sampler 210 and a reshaper/tone mapper 212. The preprocessed video data, which may represent SDR video data is then applied to an encoder 214.

FIG. 2A describes an example process for converting HDR normalized video data samples ($R_H$, $G_H$, $B_H$), in reference to a set of color primaries of interest (e.g. BT.2020 or BT.709), to corresponding (same pixel location) normalized SDR samples ($R_S$, $G_S$, $B_S$), in the same color primaries. This process is referred to below as Tone-Mapping (TM).

The example process enforces the following relationship for tone mapping of samples at pixel location (i, j)

$$\begin{bmatrix} R_S \\ G_S \\ B_S \end{bmatrix} = \alpha \cdot \begin{bmatrix} R_H \\ G_H \\ B_H \end{bmatrix} \quad (1)$$

Note that $\alpha$ is a scalar which can be different for different pixel locations. Thus to fully describe a tone mapper one can construct a 2D array of scalar scaling factors. Because the tone-mapping is desirably reversed at the decoder, the 2D array of scalar scaling factors is desirably transmitted to the decoder, for example as metadata included in the encoded bitstream. Transmitting this amount of metadata, however, may be costly in terms of increased bitrates. It is contemplated that the tone map may be generated for video data representing a picture or sub-picture element.

The following examples use a reshaping tool that formats data describing a transfer function compactly into a self-referential metadata structure in the bitstream. The reshaping tool can be used for the example scalar-scale-tone-mapping technique described in this section.

As depicted in FIG. 2A, the input to reshaping process on the encoder side is ($Y_H$, $Cb_H$, $Cr_H$) samples which are obtained by passing the RGB samples ($R_H$, $G_H$, $B_H$), through a transfer function 204 to obtain ($R_H'$, $G_H'$, $B_H'$).

The transfer function 204 is followed by a linear color space conversion operation 206 as follows:

$$Y_H = \alpha_{yr} \cdot R'_H + \alpha_{yg} \cdot G'_H + \alpha_{yb} \cdot B'_H \quad (2)$$

$$Cb_H = \alpha_{Cbr} \cdot R'_H + \alpha_{Cbg} \cdot G'_H + \alpha_{Cbb} \cdot B'_H \quad (3)$$

$$Cr_H = \alpha_{Crr} \cdot R'_H + \alpha_{Crg} \cdot G'_H + \alpha_{Crb} \cdot B'_H \quad (4)$$

Figure 3:
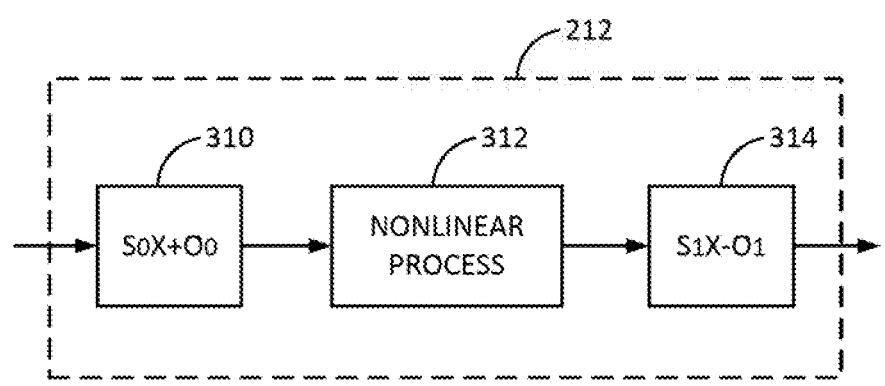
FIG. 3 is a block diagram showing details of the reshaper/tone mapper shown in FIG. 2A.

The samples are then quantized to, for example, 10-bit values in quantizer 208. The chrominance components of the quantized video samples are then down-sampled from 4:4:4 to 4:2:0 in the downsampler 210. The downsampled chrominance and luminance samples are then applied to a reshaper/tone mapper 212 and encoded, for example as a Main 10 HEVC signal by an encoder 214. Details of the reshaper/tone mapper 212 are shown in FIG. 3. The output of the reshaper/tone mapper 212 in this example is YCbCr samples that conform to an SDR signal. That is to say, the output samples are essentially the same as tone-mapped SDR samples ($R_S$, $G_S$, $B_S$) processed going through a desired transfer function to obtain ($R_S'$, $G_S'$, $B_S'$) followed by the same color space conversion as was applied to the HDR samples in block 206.

In the context of backward compatible SDR, the desired transfer function may be a gamma function as described in BT.709 or the inverse of the gamma function described in BT.1886. The following is a more generic form of the function with parameters $CON_S$ (maximum contrast which is the ratio of maximum to minimum brightness) and the power factor $\gamma_s$: (Note that in the following $\gamma_S$ is the inverse of display gamma, e.g. found in BT.1886.)

$$I' = g_S \cdot (I)^{\gamma_S} - b_S \quad (5)$$

where $g_S$ (gain) and $b_S$ (black lift) parameters are given by:

$$g_S = \frac{(CON_S)^{\gamma_S}}{(CON_S^{\gamma_S} - 1)} \quad (6)$$

$$b_S = \frac{1}{(CON_S^{\gamma_S} - 1)} \quad (7)$$

Note that the above holds for $\gamma_S \leq 1$. For specific cases of BT.709 and BT.1886, the $\gamma_S$ is 0.45 and $1/2.4 \approx 0.417$, respectively.

To conduct scalar-scale tone-mapping in the YCbCr domain, it is noted that the constrained mapping has one degree of freedom (i.e. $\alpha$ in Eq. 1). Therefore a can be found for one of the three SDR components and the other two components may be determined using Eq. (1).

In this example, the mapping from $Y_H$ to $Y_S$ is used to identify the value $\alpha$ as follows:

$$Y_S = (\alpha_{yr} \cdot (g_S \cdot R_S^{\gamma_S} - b_S) + \alpha_{yg} \cdot (g_S \cdot G_S^{\gamma_S} - b_S) + \alpha_{yb} \cdot (g_S \cdot B_S^{\gamma_S} - b_S)) \quad (8)$$

Assuming $\alpha_{yr} + \alpha_{yg} + \alpha_{yb} = 1$, Eq. (8) yields:

$$Y_S = g_S \cdot (\alpha_{yr} \cdot R_S^{\gamma_S} + \alpha_{yg} \cdot G_S^{\gamma_S} + \alpha_{yb} \cdot B_S^{\gamma_S}) - b_S \quad (9)$$

From Eq. (1), we can find a as follows:

$$Y_S = (\alpha^{\gamma_S} \cdot g_S \cdot (\alpha_{yr} \cdot R_H^{\gamma_S} + \alpha_{yg} \cdot G_H^{\gamma_S} + \alpha_{yb} \cdot B_H^{\gamma_S}) - b_S) \quad (10)$$

This example uses a transfer function in block 204 for the HDR signal that has the same power factor as the SDR signal (i.e. $\gamma_S = \gamma_H = \gamma$) but perhaps with a different contrast factor $CON_H$ which, applying equations 6 and 7 with $CON_H$ instead of $CON_S$ yields $g_H$ and $b_H$.

$$Y_S = \left(\alpha^\gamma \cdot g_S \cdot \left(\frac{Y_H + b_H}{g_H}\right) - b_S\right) \quad (11)$$

or:

$$\alpha = \left(\frac{g_H}{9_s} \cdot \frac{Y_S + b_S}{Y_H + b_H}\right)^{1/\gamma} \quad (12)$$

The mapping of $Y_H$ to $Y_S$ samples, which is used to find the scaling factors for inverse reshaping, can be done on a per pixel basis to generate a two-dimensional scaling map. Signaling the inverse map to the decoder, however, to perform the inverse tone mapping might have a large overhead in terms of bit-rate. Alternatively, as described below, the luminance tone map may be modeled as a piece-wise polynomial transfer function reshaper that can be signaled more efficiently.

Once the value $\alpha$ is known, the reshaping of chrominance can be determined using Eq. 1 to allow the reshaper/tone mapper block 212 to generate a scalar-scale tone mapped version of the HDR signal in YCbCr domain.

$$Cb_S = \frac{Y_S + b_S}{Y_H + b_H} \cdot Cb_H \quad (13)$$

$$Cr_S = \frac{Y_S + b_S}{Y_H + b_H} \cdot Cr_H \quad (14)$$

Note that in the above it is assumed that $\alpha_{Cbr} + \alpha_{Cbg} + \alpha_{Cbb} = \alpha_{Crr} + \alpha_{Crg} + \alpha_{Crb} = 0$ which is the case for BT.2020 and BT.709. Also for BT.2020 and BT.709, $C_S \approx 209.11$ and $b_S \approx 0.0993$.

The above derivation was done on the encoder side assuming YCbCr samples are in 4:4:4 format and no floating to fixed length coding (quantization) has taken place. In the next section we consider operations on the decoder side where the above assumptions may not be valid.

As depicted in FIG. 2B the bit stream is decoded by a decoder 222 to provide SDR video data. The SDR data, as 4:2:0 samples, is applied to the inverse reshaper/tone mapper 224. The inverse reshaper/tone mapper may scale and offset the video data before and after tone mapping to reverse the operations of the reshaper 212 shown in FIG. 3. The reshaped video data is then applied to upsampler 226 which upsamples the chrominance information to change the video data from a 4:2:0 format to a 4:4:4 format. Next, block 228 inverts the quantization operation performed by the quantizer 208 in the encoder 200. This block may, for example, convert the 10-bit fixed-point samples into floating point samples compatible with EXR file format or into fixed-point samples having a greater bit depth (e.g. 16-bit samples) by adding zero-valued more significant bits to 10-bit samples. The video samples provided by the inverse quantizer 228 are then color converted using an inverse of the operation performed by block 206 of the encoder and processed by an inverse transfer function block 232 which inverts the transfer function performed by block 204 of the encoder. The output data provided by the inverse transfer function 232 is a reconstructed linear HDR RGB signal.

With regard to the scale and shift operations performed by the inverse reshaper/tone mapper 224, in the most general case, the example metadata structures described below for sending information about the transfer function implemented by the inverse reshaper/tone mapper 224 support post-reshaping scale and shift ($S_1$ and $O_1$) on the encoder side as depicted in FIG. 3. They also support scale and shift for post-inverse reshaping operation ($S_0$ and $O_0$) on the decoder side (e.g. to maximize code-level utilization of HDR signal). It is desirable to capture both types of scale and shift plus the tone mapping operation in a single mapping operation based on the reconstructed luminance samples.

Considering all the requirements above, the example encoder sends the following to the decoder in the metadata structure:

1—A piece-wise-polynomial function, $M_Y(\cdot)$ which describes the mapping of reconstructed $Y_S$ samples to $Y_H$.

2—A piece-wise-polynomial function, $M_C(\cdot)$ per chrominance component which describes the mapping of chrominance component $C_S$ ($Cb_S/Cr_S$) to $C_H$ ($Cb_H/Cr_H$) based on Eq. 13 and Eq. 14 as follows:

$$C_H = M_C(Y_S) \cdot (C_S + \text{Offset}_{C1}) - \text{Offset}_{C0} \quad (15)$$

where $$M_C(Y_S) = \frac{S_{Y0} \cdot S_{Y1}}{S_{C0} \cdot S_{C1}} \cdot \frac{M_Y(Y_S) + B_H}{Y_S + B_S} \quad (16)$$

$$B_H = \frac{(O_{Y0} + b_H)}{S_{Y0}} \quad (17)$$

$$B_S = S_{Y1} \cdot (O_{Y1} + b_S) \quad (18)$$

$$\text{Offset}_{C0} = \frac{O_{C0}}{S_{C0}} \quad (19)$$

$$\text{Offset}_{C1} = S_{C1} \cdot O_{C1} \quad (20)$$

Note that the mapping function $M_C(\cdot)$ can be either transmitted to the decoder based on a piece-wise polynomial function (i.e. the same scheme which is utilized for transmission of $M_Y(\cdot)$), or it may be derived on the decoder side from $M_Y(\cdot)$, $S_{Y0}$, $S_{Y1}$, $S_{C0}$, $S_{C1}$, $B_H$ and $B_S$ which are signaled in the metadata structure.

Also to address the problem of unaligned Y and Cr/Cb samples in 4:2:0, in the example system, the chrominance reshaping operation as in Eq. 13 to 16 use the nearest-neighbor or collocated Y sample relative to the Cr/Cb samples.

The materials that follow present example syntaxes that define how the transfer functions are represented in the metadata structure sent from the encoding system 200 to the decoding system 220 (shown in FIG. 2B). While described in terms of the inverse reshaper/tone mapper 224, it is contemplated that this metadata structure may be used to signal the inverse transfer function 232 to the decoding system 220 shown in FIG. 2B.

In one example, the output of inverse reshaper/tone mapper can be represented as a piecewise function with N segments, the N functions $f_i(x)$, $0 <= i < N$, can be defined so that $$f(x) = f_i(x), \text{ for } x_i \leq x < x_{i+1} \quad (21)$$

In one implementation, the N+1 segment boundary points $x_i$, are referred to herein as pivot points. These pivot points as well as parameters describing equations that model the piecewise segments can be signaled in the metadata structure. If $f_i(x)$ is a polynomial having an order of $ORD_i$ the metadata describing the polynomial includes $ORD_i+1$ parameters. Based on the values signaled, a LUT corresponding to the inverse reshaping transfer function can be reconstructed at the decoding system 220. This LUT is the inverse of the scalar tone map described by equation (1). As set forth above, a single LUT may be used for all components, with cross-channel scaling to recover the other components, or different LUTs can be used for the different color components. In the latter case, an indication of which LUT is to be used for the reshaping for a given color component in a given image or sub-image processing window can also be signaled in the metadata structure. To reduce the amount of metadata used to signal the multiple (L) inverse reshaping transfer functions, the corresponding piecewise functions for L LUTs may be signaled in a self-referential metadata structure containing the metadata sent from the encoding system 200 to the decoding system 220.

Figure 4:
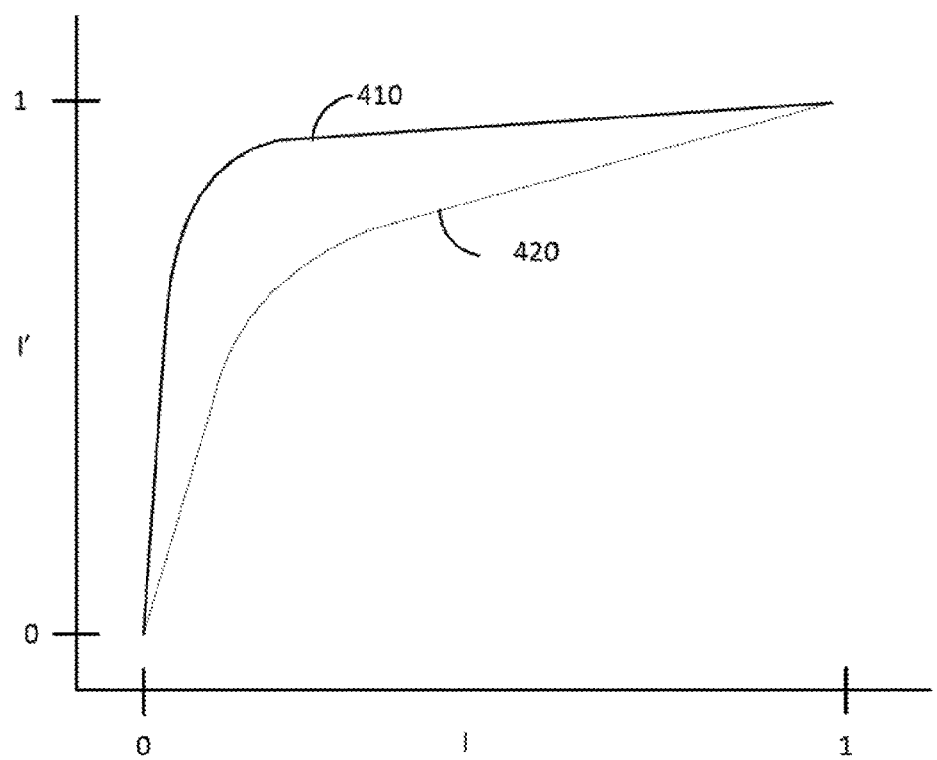
FIG. 4 is a graph showing example normalized transfer functions that may be applied by the encoder system shown in FIG. 2A.
Figure 5:
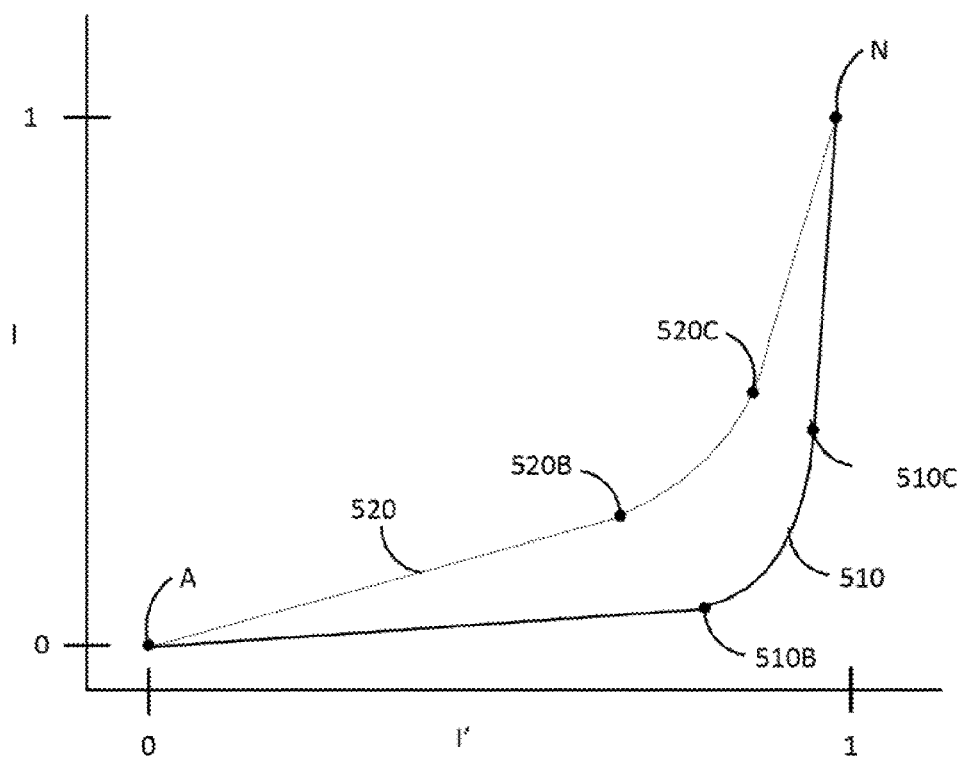
FIG. 5 is a graph showing example inverse normalized transfer functions that may be applied by the decoder system shown in FIG. 2B.

FIGS. 4 and 5 show example reshaping transfer functions and inverse transfer functions, respectively. The functions 410 and 420 shown in FIG. 4 represent normalized gamma functions. The inverses of the transfer functions shown in FIG. 4 are illustrated by the functions 510 and 520 shown in FIG. 5. The inverse transfer function 510 is divided into three segments, defined by four pivot points. The initial pivot point, A, and final pivot point, N, are common for both inverse transfer functions. Function 510 has two pivot points, 510B and 510C in addition to pivot points A and N. It is noted that the segment between pivot points A and 510B is approximately linear (e.g. has a quadratic coefficient that is less than 5% of its linear coefficient). The segment between points 510B and 510C exhibits a curve and, thus, may have significant second order and possibly third order coefficients. The segment between the pivot point 510C and pivot point N is also approximately linear.

The transfer function defined by curve 520 is similar to that defined by 510 in that the segment between points A and 520B is approximately linear, the segment between points 520B and 520C is curved and the segment between points 520C and N is approximately linear.

The materials that follow present example syntaxes that define how the transfer functions may be represented in the metadata structure sent from the encoding system 220 to the decoding system 220 (shown in FIG. 2B).

In an example syntax in TABLE 1, a number of reshape transfer functions, NumLutReshape, may be signaled in the metadata, and an index value, lut_reshape_index[c], may be used to select one of the inverse reshaping function for a color component c of a particular video data set. As described above each component YCbCr may have a separate reshaping function or a single reshaping function (e.g. $M_Y(\cdot)$) may be used for all of the components with appropriate cross-channel scaling to recover the other components. The metadata structure defined by TABLE 1 includes both the metadata defining the transfer functions and the selection of a particular transfer function for a particular video data set. Alternatively, the metadata defining the NumLutReshape LUTs (shown in lines 1-20 of TABLE 1) may be included in metadata at a relatively high level (e.g. inage essence, Sequence or GOP) while metadata specifying the reshape_id of a specific LUT to use for a particular component as well as the offset and scale values (not shown in TABLE 1) to use for the component (shown in lines 21-30 of TABLE 1) may be signaled in the metadata at a lower level (e.g. Picture, Slice or Processing Window) conforming to the video data set to which the transfer function is to be applied. The materials that follow concern metadata used in the inverse reshaping/tone mapping operation 224. Thus, for the sake of simplicity, the inverse reshaping/tone mapping operations described here may be referred to as simply reshaping operations or transfer functions.

The LUT reshaping function per component c can be computed using the piecewise polynomial functions as follows, where table k=lut_reshape_index[c] is used, 0<=k<NumLutReshape. The input value is x and the output value is computed as f(x) for the $i^{th}$ segment. These output values may be scaled or normalized to correspond to appropriate output values.

$$f(x) = \sum_{j=0}^{ORD_i} a_{ij}(x - x_i)^j, \text{ for } x_i \le x < x_{i+1}$$

Where: $x_i$=signal_reshape_coded_pivot_value[k][i];
 $a_{ij}$=poly_coef[k][i][j];
 $ORD_i$=poly_order[k][i];
 0≤i≤signal_reshape_num_pivots_minus2[k]

Because the disclosed metadata structure is self-referential, it allocates data space only when it is needed. Furthermore, because the structure allows for non-linear equations, the transfer functions implemented from the metadata model the transfer function better than a linearly interpolated segmented function having the same number of pivot points.

The reshaping parameter syntax, shown in TABLE 1 defines multiple inverse reshaping functions for use with an image essence, image sequence, group of pictures or picture. Each component (e.g. Y, Cb, Cr) of each picture, or of each sub-picture element, such as a slice or processing window, may specify one of these transfer functions in the metadata. This syntax allows for one to three indexes (e.g. Y, Cb, Cr) to be specified for each image data set (e.g. frame, slice or processing window).

An SEI message may be used to signal a metadata structure that defines one or more segmented transfer functions that maybe applied to a multiple picture sequence, a single picture or a sub-picture element such as a processing window. TABLE 1 is a first example syntax that may be used to signal such a metadata structure. This structure is suitable for use with the HEVC standard (Recommendation ITU-T H.265|International Standard ISO/IEC 23008-2, HEVC version 2, Oct. 2014) (hereinafter "the HEVC Standard") which is incorporated herein by reference.

TABLE 1

|  | Descriptor | Line |
| --- | --- | --- |
| hdr_reshaping( payloadSize ) { | | |
|    reshape_output_luma_bit_depth_increment | ue(v) | 1 |
|    reshape_output_chroma_bit_depth_increment | ue(v) | 2 |
|    reshape_present_flag | u(1) | 3 |
|    if( reshape_present_flag ) { | | 4 |

TABLE 1-continued

|  | Descriptor | Line |
|---|---|---|
| num_lut_reshape_greater1_flag | u(1) | 5 |
| if ( num_lut_reshape_greater1_flag ) |  | 6 |
|   num_lut_reshape_minus2 | u(4) | 7 |
| for( k = 0; k < NumLutReshape; k++ ) { |  | 8 |
|   reshape_num_pivots_minus2 [k] | u(3) | 9 |
|   for( i = 0; i < reshape_num_pivots_minus2[ k ] + 2; i++ ) { |  | 10 |
|     reshape_coded_pivot_value[ k ][ i ] | u(10) | 11 |
|   } |  | 12 |
|   for( i = 0; i < reshape_num_pivots_minus2[ k ] + 1; i++ ) { |  | 13 |
|     smoothness_degree[ k ][ i ] | ue(v) | 14 |
|     poly_degree_of_freedom_minus1[ k ][ i ] | ue(v) | 15 |
|     for( j = 0; j < poly_degree_of_freedom_minus1[ k ][ i ] + 1; j++ ) { |  | 16 |
|       poly_free_coef[ k ][ i ] [ j ] | se(v) | 17 |
|     } |  | 18 |
|   } |  | 19 |
| } |  | 20 |
| for( c = 0; c < 3; c++ ) { |  | 21 |
|   if ( num_lut_reshape_greater1_flag ) { |  | 22 |
|     lut_reshape_index[ c ] | u(4) | 23 |
|   } |  | 24 |
|   reshaping_mode[ c ] | u(4) | 25 |
|   if (reshaping_mode[ c ] > 0) { |  | 26 |
|     lut_offset_1[ c ] | se(v) | 27 |
|     lut_offset_2[ c ] | se(v) | 28 |
|     lut_scale_1[ c ] | u(16) | 29 |
|     lut_scale_2[ c ] | u(16) | 30 |
|   } |  | 31 |
|   } |  | 32 |
| } |  | 33 |
| } |  | 34 |

This syntax items in TABLE 1 are described as follows. The value reshape_output_luma_bit_depth_increment at line 1 specifies the sample bit depth increment of the output luminance component of the reshaping process relative to the bit depth of the input luminance component (8+bit_depth_luma_minus8) specified in the HEVC Standard. The value of reshape_output_luma_bit_depth_increment has a range from 0 to 8. The bit depth of the output luminance samples, BitDepthReshapeOutputLuma, is derived as follows:

BitDepthReshapeOutputLuma = bit_depth_luma_minus8+8+reshape_output_luma_bit_depth_increment Similarly, the value reshape_output_chroma_bit_depth_increment at line 2 specifies the sample bit depth increment of the output chrominance component of the reshaping process relative to the bit depth of the input chrominance component(8+bit_depth_chroma_minus8). The value of reshape_output_chroma_bit_depth_increment has a range from 0 to 8. The bit depth of the output chrominance samples, BitDepthReshapeOutputChroma, is derived as follows:

BitDepthReshapeOutputChroma=bit_depth_chroma_minus8+8+reshape_output_chroma_bit_depth_increment The values BitDepthReshapeOutputLuma and BitDepthReshapeOutputChroma describe the respective numbers of bits of the luminance and chrominance samples that are output by the inverse quantizer 228 shown in FIG. 2B.

When reshape_present_flag (line 3) is equal to 1, syntax elements for reshaping parameters are present. When reshape_present_flag is equal to 0 syntax elements for reshaping parameters are not present and there is no reshaping operation. When not present the value of reshape_present_flag is inferred to be equal to 0.

When num_lut_reshape_greater1_flag (line 5) is equal to 0, there is only one reshaping LUT function. When num_lut_reshape_greater1_flag is equal to 1, multiple reshaping LUT functions are defined in the sequence parameter set (SPS). When not present, the value of num_lut_reshape_greater1_flag is inferred to be equal to 0.

If multiple reshaping functions exist, the number of such functions is given by 2+num_lut_reshape_minus2 (line 7). In this example, the value of num_lut_reshape_minus2 has a range from 0 to 14. Each reshaping function defines a look-up-table (LUT). The number of reshape LUTs, NumLutReshape, is derived as follows:

NumLutReshape=num_lut_reshape_greater1_flag * (num_lut_reshape_minus2+1) +1

In the syntax of TABLE 1, the variable k is used to specify a particular reshaping function (LUT). Each function is divided into segments and each segment is modeled by an equation. The value 2+reshape_num_pivots_minus2[k] (line 9) specifies the number of pivot values in the $k^{th}$ piecewise segmented function. In this example, the value of reshape_num_pivots_minus2[k] has a range from 0 to 7.

Also in TABLE 1, the variable i is used to specify a particular reshape_coded_pivot_value[k][i] (line 11). This value is the $i^{th}$ pivot value for the $k^{th}$ LUT. Each pivot point except the last pivot point has a distinct reshaping transfer function. In this example, the value of reshape_coded_pivot_value[k][i] ranges between 0 and 1023.

The value smoothness_degree[k][i] (line 14) specifies the smoothness condition for the polynomial function of segment i of reshaping transfer function k. In this implementation, the value of smoothness_degree[k][i] has a range between 0 and 3. This value specifies constraints on the set of coefficients. A value of 0 indicates no constraints. A value of 1 indicates that the segments defining the transfer function are contiguous—the starting endpoint of one segment is the same as the ending point of the previous segment. A value of 2 indicates that the segments have corresponding slopes at the pivot points, that is to say, the slope of the transfer function at the pivot point is the same for both the current and previous segments. As described below, the smoothness_degree value limits the number of coefficients that are provided for every pivot point except the first pivot point and the last pivot point, which has no coefficients associated with it.

The value 1+poly_degree_of_freedom_minus1[k][i] (line 15) specifies the number of coefficients signaled for the polynomial function of pivot point (segment) i of table k. In this example, the value of poly_degree_of_freedom_minus1 [k][i] has a range between 0 and (3—smoothness_degree[k] [i]). Thus, the combination of smoothness_degree[k][i] and poly_degree_of_freedom_minus1[k][i] determine the number of coefficients that are specified for transfer function k. The value 1+poly_degree_of_freedom_minus1 specifies the order of the equation used to model the transfer function between the current pivot point and the next pivot point. Because coefficient values of a constrained segment may be inferred from the equation describing the previous segment, the number of coefficients in a coefficient set may be reduced. For example, for a segment having a smoothness degree of 1 and an order of 2, the first coefficient in coefficient set includes only two coefficients as the first coefficient (i.e. the displacement coefficient) can be inferred from the end point of the equation defining the previous segment. Similarly, a segment having a smoothness degree of 2 and an order of 2 has only one coefficient in its coefficient set because the first two coefficients (displacement and slope) can be inferred from the end point of the equation defining the previous segment.

The value poly_free_coef[k][i][j] (line 17) specifies the polynomial coefficient j for the polynomial function of segment i of reshaping transfer function k. The value of poly_coef[k][i][j] has a range from $-2^{21}$ to $2^{21}-1$), inclusive.

The above syntax elements define the inverse reshaping transfer functions signaled in the metadata structure generated by the encoder 220. The remaining elements of the metadata structure concern the reshaping transfer function that is to be used for a particular video data set.

The value lut_reshape_index[c] specifies the index of the reshaping function to use for color component c. The value of lut_reshape_index[c] ranges from 0 to 15. If lut_reshape_index[c] is not present, it is inferred to be equal to 0.

The value reshaping_mode[c] (line 25) specifies how the LUT for the $c^{th}$ reshaping transfer function is indexed and used in the reshaping process. The variable c has a value of 0, 1 or 2, indicating Y, Cb or Cr, respectively. In one implementation, the value of reshaping_mode[c] has a range between 0 and 15. Two modes are described in detail below. In the first mode, each color component is associated with a respective transfer function. The second mode uses a cross-channel function, in this case, a cross luminance function so that, each chrominance data set is modified by the luminance transfer function with an input scale and offset (lut_scale_1 [c] and lut_offset_1[c]) and an output scale and offset (lut_scale_2[c] and lut_offset_2[c]) for the particular chrominance component. It is contemplated that other modes may be implemented, for example a cross-channel function that uses the transfer function for Cb to determine the sample values for Cr. Each of these other modes may be represented by a distinct value of reshaping_mode[c].

lut_offset_1[c] specifies an offset value for the input LUT value. This value is added to the scaled input value x to obtain the LUT output value. The value of lut_offset_1[c] is a signed integer having a range between −1024 to +1023, inclusive.

lut_offset_2[c] specifies an offset value for the output LUT value. This value is added to the scaled LUT output value to obtain the reshaped color component value (e.g. Y, Cb, Cr). The value of lut_offset_2[c] is a signed integer having a range between −1024 to +1023, inclusive.

lut_scale_1[c] specifies the input scale value for component c. The value of lut_scale_1[c] shall be in the range of 0 to 65535, inclusive.

lut_scale_2[c] specifies the output scale value for component c. The value of lut_scale_2[c] shall be in the range of 0 to 65535, inclusive.

As an alternative to signaling the reshaping/tone mapping function as a piecewise segmented transfer function, the encoder 200 may signal a known transfer function, for example, one of the transfer functions shown in FIG. 5, with parameter values used to adapt the transfer function for a particular data set. TABLE 2 describes an example syntax that may be used in an HDR adaptation SEI message in an H.265 HEVC raw byte sequence payload (RBSP) to signal an inverse reshaping/tone mapping function for use by block 224 of FIG. 2B.

TABLE 2

|  | Descriptor | Line |
|---|---|---|
| hdr_adaptation ( payloadSize ) { |  |  |
|   hadp_id | ue(v) | 1 |
|   hadp_cancel_flag | u(1) | 2 |
|   if( !hadp_cancel_flag ) { |  | 3 |
|     hadp_persistence_flag | u(1) | 4 |
|     hadp_full_range | u(1) | 5 |
|     atf_present_flag | u(1) | 6 |
|     if( atf_present_flag ){ |  | 7 |
|       atf_id | u(2) | 8 |
|       for( i=0; i<NumberOfAtfParameters; i++ ) |  | 9 |
|         atf_param[i] | u(32) | 10 |
|     } |  | 11 |
|     for( c=0; c <= 2; c++) { |  | 12 |
|       range_adaptation_present_flag | u(1) | 13 |
|       If ( range_adaptation_present_flag ) { | u(1) | 14 |
|         scale[ c ] | u(16) | 15 |
|         offset [ c ] | i(16) | 16 |
|       } |  | 17 |
|     } |  | 18 |
|   } |  | 19 |
| } |  | 20 |

The values in the syntax are defined as follows.

hadp_id (line 1) contains an identifying number that may be used to identify the purpose of the HDR adaptation information SEI messages. The value of hadp_id has a range of from 0 to $2^{32}-2$, inclusive.

hadp_cancel_flag (line 1) indicates whether the HDR adaptation information SEI message cancels the persistence of any previous HDR adaptation SEI message in output order that applies to the current layer (hadp_cancel_flag equal to 1). When hadp_cancel_flag is equal to 0, HDR adaptation information follows. If hadp_cancel_flag is 1, none of the syntax elements in lines 4-16 are included in the SEI message.

hadp_persistence_flag (line 4) specifies the persistence of the HDR adaptation information SEI message for the current layer. hadp_persistence_flag equal to 0 specifies that the HDR adaptation information that applies to the current layer. When hadp_persistence_flag is equal to 1, the adaptation information persists until either condition A or B is true. These conditions assume that picA is the current picture.
  A) A new coded layer-wise video sequence (CLVS) of the current layer begins.
  B) A picture picB in the current layer in an access unit containing an HDR adaptation information SEI message with the same value of hadp_id and applicable to the current layer is output for which PicOrderCnt(picB) is greater than PicOrderCnt( picA), where PicOrderCnt (picB) and PicOrderCnt(picA) are the picture order count values (PicOrderCntVal) of picB and picA, respectively, immediately after the invocation of the decoding process for picture order count for picB.

offset[c] (line 16) specifies the offset value for component c. The value of offset[c] shall be in the range of −32768 to 32767, inclusive. When offset[c] is not present, it is inferred to be 0.

TABLE 3

| atf_id | Transfer Characteristic | Informative Remarks |
|---|---|---|
| 0 | Unspecified | Image characteristics are unknown or are determined by the application. |
| 1 | $V = [(L_C \cdot C)^\gamma - 1]/(C^\gamma - 1)$ for $L_c >= C^{-1}/[(1 - \gamma)^{1/\gamma}]$<br>$V = L_C \cdot \gamma \cdot C/[(C^\gamma - 1) \cdot (1 - \gamma)^{(1 - 1/\gamma)}]$ for $L_c <= C^{-1}/(1 - \gamma)^{1/\gamma}]$<br>$C$ = atf_para1<br>$\gamma$ = atf_para1 | Adaptive form of the following recommendations Rec. ITU-R BT.709-5<br>Rec. ITU-R BT.1361 conventional colour gamut system<br>(functionally the same as the values 6, 14, and 15) |
| 2 | $V = ((c_1 + c_2 * L_c^n) \div (1 + c_3 * L_c^n))^m$ for all values of $L_c$<br>$c_1 = c_3 - c_2 + 1 = 3424 \div 4096 = 0.8359375$<br>$c_2 = 32 * 2413 \div 4096 = 18.8515625$<br>$c_3 = 32 * 2392 \div 4096 = 18.6875$<br>$m = 128 *$ atf_para1 $\div 4096$<br>$n = 0.25 *$ atf_para2 $\div 4096$<br>for which $L_c$ equal to 1 for peak white is ordinarily intended to correspond to a display luminance level of 10000 candelas per square meter | Society of Motion Picture and Television Engineers ST 2084 for 10, 12, 14, and 16-bit systems. |
| 3 | $V = \text{Log}10(C \cdot L_C + 1)/\text{Log}10(C + 1)$<br>for $1 >= L_c >= 0$<br>$C$ = atf_para1 | Adaptive Weber Law |

Picture order count values (PicOrderCntVal) are used to identify pictures, for deriving motion parameters in merge mode and motion vector prediction, and for decoder conformance checking. The values PicOrderCnt( ) and PicOrderCntVal are defined in the HEVC standard.

hadp_full_range (line 5) specifies the black level and range of the input component signals to HDR adaptation process. hadp_full_range equal to 0 specifies the sample range to be standard range, while hadp_full_range equals to 1 specifies the sample range to be full range. When the hadp_full_range_flag syntax element is not present, the value of hadp_full_range_flag is inferred to be equal to 0.

atf_present_flag (line 6) equal to 1 indicates that adaptive transfer functions will be applied to the input signal for each component. atf_present_flag equal to 0 indicates that atf_id, atf_para1 and atf_para2 are not present in the RBSP and atf_id is inferred to be 0 (the transfer characteristics are unspecified or are determined by the application). The use of this flag allows the parameters to be provided only when they are needed, reducing the amount of data in the SEI message.

atf_id (line 8) specifies the opto-electronic transfer characteristic of the source picture as a function of a linear optical intensity input Lc with a nominal real-valued range of 0 to 1.

atf_param[i] (line 10) specifies the value of parameters for transfer function which is identified by atf_id.

range_adaptation_present_flag (line 13) equal to 1 indicates the syntax elements scale [c] (line 15) and offset [c] (line 16) are signaled in this HDR adaptation information. When the value range_adaptation_present_flag is equal to 0, that scale[c] and offset[c], described below, are not present in the RBSP. The examples of the application of values scale[c] and offset[c] are shown in the transfer functions as described below in TABLE 3.

scale[c] (line 15) specifies the scale value for component c. The value of scale[c] shall be in the range of 0 to 65535, inclusive. When scale[c] is not present, it is inferred to be 256.

TABLEs 2 and 3 illustrate how various predetermined inverse transfer functions may be signaled by the encoder 200 to the decoder 220 shown in FIGS. 2A and 2B. Using similar techniques, inverse transfer functions for BT.2020 and BT.709 as well as the display transfer function for BT.1886 may be signaled. These transfer functions may be signaled, for example for use by the inverse transfer function block 232. In one implementation of the invention, a number of predetermined transfer functions may be defined in the syntax and, for a particular image data set, one of these predetermined transfer functions may be selected as the transfer function for the inverse reshaping/tone mapping block 224. The parameters of the selected predetermined transfer function may be modified to model the inverse reshaping transfer function determined according to equations (11) to (20) above. This inverse reshaping transfer function may be signaled with the modified parameters in the metadata structure, as described above with reference to TABLE 2.

Utilizing the techniques described in this document one should expect to generate digital video data sets that can be decoded to HDR quality while achieving backward compatibility with legacy HEVC-Main10 profile decoder to obtain a viewable signal for a legacy SDR display.

The invention claimed is:

1. A high dynamic range (HDR) coding process with standard dynamic range (SDR) backwards compatibility, the HDR coding process comprising:
   generating a tone map describing a transformation from data representing a first color component of an HDR video image to data representing a corresponding first color component of an SDR video image on a pixel-by-pixel basis;
   modeling the tone map as a reshaping transfer function;
   processing data representing one or more additional color components of the HDR video image using another reshaping transfer function to generate data representing one or more additional color components of the SDR video image;
determining an inverse reshaping transfer function that corresponds to the reshaping transfer function, another inverse shaping transfer function from the other reshaping transfer function;
generating a metadata structure describing the inverse reshaping transfer function and the other reshaping transfer function, the metadata structure including:
   a first function describing a mapping of reconstructed SDR samples to HDR samples for a first color component representing luminance; and
   a second function describing a mapping of reconstructed SDR samples to HDR samples for the one or more additional color components, where the second function is different than the first function, each representing a representative chrominance; and
   encoding the SDR video image to generate encoded video data including the metadata structure;
wherein the generating of the metadata structure describing the inverse reshaping transfer function includes:
dividing the inverse reshaping transfer function into P-1 segments defined by a P pivot points, where P is an integer;
fitting an equation to each segment, each equation having an order, N, where N is an integer that varies based on characteristics of the segment;
for each pivot point except the last pivot point:
allocating a cell is the metadata structure to hold a value indicating a number of coefficients to be stored for the pivot point;
allocating a number of cells in the metadata structure sufficient to describe the coefficients for the pivot point:
storing a value indicating the number of cells for the pivot point into a first one of the allocated cells;
storing the coefficient values in the remaining allocated cells;
further including, for each pivot point except the last pivot point:
allocating a cell in the metadata structure for storing a smoothness degree, the smoothness degree indicating constraints on the equations fitted to the segment, wherein, for each pivot point except the last pivot point:
the number of cells allocated to describe the coefficients of the pivot point is N when the smoothness degree indicates that the functions modeling the segments are continuous; and
the number of cells allocated to describe the coefficients of the pivot point is N-1 when the smoothness degree indicates that the functions modeling the segments are continuous and have corresponding slopes at the pivot points.

2. The method of claim 1, wherein the number of coefficients to be stored for each of the pivots point except the last pivot point is N+1 where N is the order of the equation for the pivot point.

3. The method of claim 1, wherein the generating of the metadata structure describing the inverse reshaping transfer function includes:
selecting a predetermined transfer function from a plurality of predetermined transfer functions, each of the plurality of predetermined transfer functions having a respectively different number of parameters;
allocating a cell in the metadata structure and storing a value identifying the selected predetermined transfer function in the allocated cell;
adjusting the parameters of the selected predetermined transfer function to approximate the reshaping transfer function;
allocating a number of cells in the metadata structure corresponding to the number of parameters for the selected predetermined transfer function and storing the adjusted parameters for the selected predetermined transfer function in the allocated cells.

4. The method of claim 1 further comprising:
receiving linear RGB HDR video image;
applying the transfer function to the RGB HDR data to generate non-linear R'G'B' HDR video image that conforms to the human visual system;
applying a linear color conversion operation to the non-linear R'G'B' HDR video image to generate color converted video data in a YCbCr color space;
determining the value of a for each Y pixel in the color converted video data, where the transfer function corresponds to pixel-based scaling computed in either the RGB or YCbCr color spaces and a is a scaling factor of the pixel-based scaling;
wherein:
the generating of the tone map includes:
   generating a portion of the tone map for the Y video data;
   based on the generated portion of the tone map for the Y video data generating at least one function for the Cb and Cr video data;
the determining of the inverse reshaping transfer function includes:
   generating data describing a first portion of the inverse reshaping transfer function from the tone map for the Y video data;
   generating data describing at least one function to be applied to the Cb and Cr video data; and
the generating of the metadata structure describing the inverse transfer function includes:
   generating a first portion of the metadata describing the first portion of the inverse reshaping transfer function; and
   generating a second portion of the metadata describing the at least one function to be applied to the Cb and Cr data.

5. The method of claim 4 wherein:
the data describing the at least one function to be applied to the Cb and Cr video data includes respective Cb and Cr reshaping transfer functions; and
the generating of the second portion of the metadata includes generating metadata describing the respective Cb and Cr reshaping transfer functions.

6. The method of claim 4 wherein:
the data describing the at least one function to be applied to the Cb and Cr video data includes respective scale and offset values for each of the Cb and Cr video data sets, the respective scale and offset values representing modifications of a multiplication of the respective Cb and Cr HDR pixel values by the reshaping transfer function for the Y video data to implement a cross-channel reshaping transform function; and
the generating of the second portion of the metadata includes generating metadata describing the respective scale and offset values for each of the Cb and Cr video data sets.

7. The method of claim 4, wherein:
the data describing the at least one function to be applied to the Cb and Cr video data includes an input offset value and an input scale value for each of the Cb and Cr video data sets and an output offset value and an output scale value for each of the Cb and Cr video data sets; and the generating of the second portion of the metadata includes generating metadata describing the respective input and output scale and offset values for each of the Cb and Cr video data sets.

8. The method of claim 4, further comprising, after applying the linear color conversion operation:

quantizing the color converted video data to a bit depth consistent with the SDR video image; and downsampling the CbCr video data to generate color converted video data in a 4:2:0 format.

9. Apparatus comprising:

a memory; and a preprocessor, coupled to the memory, the preprocessor including program instructions that cause the processor to perform single layer high dynamic range (HDR) coding process with standard dynamic range (SDR) backwards compatibility, including instructions to:

generate a tone map describing a transformation from data representing a first color component of an HDR video image to data representing a corresponding first color component of an SDR video image on a pixel-by-pixel basis;

model the tone map as a reshaping transfer function;

process data representing one or more additional color components of the HDR video image using another reshaping transfer function to generate data representing one or more additional color components of the SDR video image;

determine an inverse reshaping transfer function that corresponds to the reshaping transfer function, another inverse shaping transfer function from the other reshaping transfer function;

generate a metadata structure describing the inverse reshaping transfer function and the other reshaping transfer function, the metadata structure including:

a first function describing a mapping of reconstructed SDR samples to HDR samples for a first color component representing luminance; and a second function describing a mapping of reconstructed SDR samples to HDR samples for the one or more additional color components, where the second function is different than the first function, each representing a representative chrominance; and encode the SDR video image to generate encoded video data including the metadata structure;

wherein the program instructions that cause the preprocessor to generate the metadata structure describing the inverse reshaping transfer function include program instructions that cause the preprocessor to:

divide the inverse reshaping transfer function into P-1 segments defined by a P pivot points, where P is an integer;

fit an equation to each segment, each equation having an order, N, where N is an integer that varies based on characteristics of the segment;

for each pivot point except the last pivot point: allocate a cell in the metadata structure to hold a value indicating a number of coefficients to be stored for the pivot point;

allocate a number of cells in the metadata structure sufficient to describe the coefficients for the pivot point;

store a value indicating the number of cells for the pivot point into a first one of the allocated cells; and store the coefficient values in the remaining allocated cells;

further including program instructions that, for each pivot point except the last pivot point, cause the preprocessor to:

allocate a cell in the metadata structure for storing a smoothness degree, the smoothness degree indicating constraints on the equations fitted to the segment;

wherein, for each pivot point except the last pivot point:

the number cells allocated to describe the coefficients of the pivot point is N when the smoothness degree indicates that the functions modeling the segments are continuous; and the number cells allocated to describe the coefficients of the pivot point is N-1 when the smoothness degree indicates that the functions modeling the segments are continuous and have corresponding slopes at the pivot points.

10. The apparatus of claim 9, wherein the program instructions that cause the preprocessor to generate the metadata structure describing the inverse reshaping transfer function include program instructions that cause the preprocessor to:

select a predetermined transfer function from a plurality of predetermined transfer functions, each of the plurality of predetermined transfer functions having a respectively different number of parameters;

allocate a cell in the metadata structure and store a value identifying the selected predetermined transfer function in the allocated cell;

adjust the parameters of the selected predetermined transfer function to approximate the reshaping transfer function;

allocate a number of cells in the metadata structure corresponding to the number of parameters for the selected predetermined transfer function and storing the adjusted parameters for the selected predetermined transfer function in the allocated cells.

11. The apparatus of claim 9 wherein:

the preprocessor is configured to receive linear RGB HDR video data; and the program instructions further cause the preprocessor to:

apply the transfer function to the RGB HDR data to generate non-linear R'G'B' HDR video image that conforms to the human visual system;

apply a linear color conversion operation to the non-linear R'G'B' HDR video image to generate color converted video data in a YCbCr color space;

determine the value of $\alpha$ for each Y pixel in the color converted video data, where the transfer function corresponds to pixel-based scaling computed in either the RGB or YCbCr color spaces and $\alpha$ is a scaling factor of the pixel-based scaling;

wherein:

the program instructions that cause the preprocessor to generate the tone map include instructions that cause the preprocessor to:

generate a portion of the tone map for the Y video data;

based on the generated portion of the tone map for the Y video data generate at least one function for the Cb and Cr video data;

the program instructions that cause the preprocessor to determine the inverse reshaping transfer function include instructions that cause the preprocessor to:

generate data describing a first portion of the inverse reshaping transfer function from the tone map for the Y video data;

generate data describing at least one function to be applied to the Cb and Cr video data; and the program instructions that cause the preprocessor to generate the metadata structure describing the inverse transfer function include program instructions that cause the preprocessor to:

generate a first portion of the metadata describing the first portion of the inverse reshaping transfer function; and generate a second portion of the metadata describing the at least one function to be applied to the Cb and Cr data.

12. A high dynamic range (HDR) coding process with standard dynamic range (SDR) backwards compatibility, the HDR coding process comprising:

generating a tone map describing a transformation from data representing a first color component of an HDR video image to data representing a corresponding first color component of an SDR video image on a pixel-by-pixel basis;

modeling the tone map as reshaping transfer function;

determining an inverse reshaping transfer function that corresponds to the reshaping transfer function;

generating a metadata structure describing the inverse reshaping transfer function including:

a function describing a mapping of reconstructed SDR samples to HDR samples for a first color component representing luminance; and encoding the SDR video image to generate encoded video data including the metadata structure;

wherein the generating of the metadata structure describing the inverse reshaping transfer function includes:

dividing the inverse reshaping transfer function into P-1 segments defined by a P pivot points, where P is an integer;

fitting an equation to each segment, each equation having an order, N, where N is an integer that varies based on characteristics of the segment;

for each pivot point except the last pivot point:

allocating a cell in the metadata structure to hold a value indicating a number of coefficients to be stored for the pivot point;

allocating a number of cells in the metadata structure sufficient to describe the coefficients for the pivot point;

storing a value indicating the number of cells for the pivot point into a first one of the allocated cells;

storing the coefficient values in the remaining allocated cells;

further including, for each pivot point except the last pivot point:

allocating a cell in the metadata structure for storing a smoothness degree, the smoothness degree indicating constraints on the equations fitted to the segment, wherein, for each pivot point except the last pivot point:

the number of cells allocated to describe the coefficients of the pivot point is N when the smoothness degree indicates that the functions modeling the segments are continuous; and the number of cells allocated to describe the coefficients of the pivot point is N-1 when the smoothness degree indicates that the functions modeling the segments are continuous and have corresponding slopes at the pivot points.

* * * * *